United States Patent [19]

Lanning

[11] Patent Number: 5,787,285
[45] Date of Patent: Jul. 28, 1998

[54] APPARATUS AND METHOD FOR OPTIMIZING APPLICATIONS FOR MULTIPLE OPERATIONAL ENVIRONMENTS OR MODES

[75] Inventor: David Lee Lanning, Boca Raton, Fla.

[73] Assignee: International Business Machines Corporation, Armonk, N.Y.

[21] Appl. No.: 515,436

[22] Filed: Aug. 15, 1995

[51] Int. Cl.[6] .................................................. G06F 9/44
[52] U.S. Cl. ............................................ 395/704; 395/708
[58] Field of Search ................................ 395/704, 709, 395/183.11, 183.14

[56] References Cited

U.S. PATENT DOCUMENTS

| | | | |
|---|---|---|---|
| 4,636,948 | 1/1987 | Gdaniec et al. | 395/676 |
| 4,924,384 | 5/1990 | Hao et al. | 395/500 |
| 5,029,104 | 7/1991 | Dodson et al. | 395/200.47 |
| 5,067,072 | 11/1991 | Talati et al. | 395/708 |
| 5,142,674 | 8/1992 | Barker et al. | 395/610 |
| 5,157,384 | 10/1992 | Greanias et al. | 345/156 |
| 5,193,190 | 3/1993 | Janczyn et al. | 395/707 |
| 5,220,516 | 6/1993 | Dodson et al. | 395/200.47 |
| 5,339,420 | 8/1994 | Hoxey | 395/706 |
| 5,530,964 | 6/1996 | Alpert et al. | 395/700 |

OTHER PUBLICATIONS

"Using Profile Information to Assist Classic Code Optimizations", Chang et al., vol. 21 (12) 1991 pp. 1301-1321.
"The Operational Profile in Software Reliability Engineering: An Overview", J. Musa, 1992, pp. 140-154.
"Predicting Program Behavior Using Real or Estimated Profiles", Wall et al., ACM SIGPLAN '91 Conf. On Prog. Lang. Design, Jun. 1991, pp. 59-70.

"An Execution Profiler for Modular Programs", Graham et al., Soft. Practice & Experience, vol. 13, 1983, pp. 671-685.

*Profile Guided Code Positioning*, K. Pettis et al., 1990 pp. 16-27.

*Using Profile Inform. to Assist Classic Code Optimizations*, P. Chang et al., vol. 21(12) 1991 pp. 1301-1321.

*Appl. of Software Reliability Modeling to Product Quality and Test Process*, W. Ehrich et al., 1990 pp. 108-116.

*The Operational Profile In Software Reliability Engineering: An Overview*, J. Musa, 1992 pp. 140-154.

*Primary Examiner*—Alvin E. Oberley
*Assistant Examiner*—Kakali Chaki
*Attorney, Agent, or Firm*—Mark S. Walker; Andrew J. Dillon

[57] ABSTRACT

The present invention optimizes an executable software program containing a plurality of basic blocks for several different operational environments or modes by identifying the basic blocks which execute for each particular operational environment or mode, and the frequency of each blocks' execution in the environment or mode. For each environment or mode, the frequency of execution for the block in that environment or mode is compared against a predetermined threshold value. Each basic block whose frequency of execution exceeds the predetermined threshold value is copied into a program segment for that environment or mode. Basic blocks whose frequency of execution does not exceed the predetermined threshold value are copied into a common code segment accessible from each of the program segments. The code in each program segment is then optimized to provide an executable code segment optimized for operation in several different environments or modes.

28 Claims, 10 Drawing Sheets

APPARATUS AND METHOD FOR OPTIMIZING APPLICATIONS FOR MULTIPLE OPERATIONAL ENVIRONMENTS OR MODES

FIELD OF THE INVENTION

This invention relates to an optimizing compiler and program development system, and more particularly to a system which optimizes executable code sequences for various operational environments or modes.

BACKGROUND OF THE INVENTION

Within the last decade or so the size of software application programs has increased dramatically. In part, this increase has been facilitated by constant hardware improvements including, increases in microprocessor speed and the reduced cost of volatile and non-volatile computer memory devices. Because of these hardware improvements, many software developers generally do not write highly optimized and efficient code, since, what the software lacks in efficiency is generally masked by the speed of the hardware.

Although there is no indication that the pace of hardware improvements is slowing, some software developers are now designing more efficient software by optimizing or "tuning" their code for a particular operational environment or mode by placing highly-used routines closer together, and optimizing the execution speed along heavily-traveled paths. The primary objective of such optimization is to reduce the time it takes a computer program to perform a particular task.

Hand tuning of a program to optimize its performance is a well-known process. A problem with such hand tuning is that it must be performed manually by the programmer. Due to the exponential growth in the size of programs in the past several years, hand tuning has become an archaic, tedious, time-consuming task which is generally performed only on the most highly utilized program sections. Hand tuning takes the programmer away from more important tasks which have greater visibility to the software's end user.

Automated tools such as optimizing compilers are now commercially available to enhance the run-time performance of a piece of software. Recent technical papers have also disclosed the use of automated "profilers" to provide data to these optimizing compilers. In general, these profilers monitor the execution of a particular piece of software and gather information on the most likely paths of execution. The optimizing compiler then uses the information gathered by the profiler to recompile the source code in a more efficient manner.

When using a given software program, different users will have different usage patterns and therefore different paths will be taken through the program. A group of users with similar usage patterns will create an "environment", which is typically defined as the conditions that effect the way in which the program runs (i.e., the control paths it takes and the data it accesses). For example, consider a telephone switching system that serves both rural and urban communities. Urban users will generally place more credit card calls, conference calls and international calls in comparison to the rural user. Therefore, since the usage patterns of the rural and urban user is different, they create distinct operational environments.

A system may also be categorized according to its operational "modes". Take for example the telephone switching system, it may consist of several different operational modes, such as, start-up operations, busy-hour operations and off-hour operations. In general, there are many different ways to categorize the operation of a system according to its operational environments or its operational modes.

A problem with the reported automated optimization processes discussed above is that they are limited to a usage pattern of a single fixed user group or a single operational mode. That is, the prior art merely discloses optimizing the code for a single operational environment or mode. Such a limited approach to optimization, often causes a degradation to the run-time performance of the program while executing in non-optimized operational environments or modes. FIG. 1 illustrates a functional block diagram of a sequence of executable code 100 optimized for a single operational environment or mode yet executed in a plurality of environment or modes as illustrated by the multiple entry points. In this case code 100 is optimized for an environment in which the entry point is entry 102. However, when the code is run in other operational environments the code may be entered at other points such as entry point 104 or entry point 106. When the code 100 is entered at these additional entry points, the operation may not be as efficient as when the code is entered at point 102.

In reality, most systems have more than one operational environment or mode and optimizing performance for a single mode or environment often results in a performance degradation to other modes. As an example, the operational mode for a telephone system may vary between start-up operations, busy hour day operations, busy hour evening operations and off hour operation for a particular user group/environment (e.g., urban users). Optimizing a telephone switch program for any of these modes may make the program less than optimal for the other modes.

For optimization to be truly effective, it must be performed on a larger scale than just a single operational mode or environment. Therefore, operational improvements can be realized by tuning a program for multiple operational environments and/or multiple different operational modes.

SUMMARY OF THE INVENTION

An object of the present invention is to provide executable code optimized for use with a plurality of operational environments or modes.

Briefly, the present invention optimizes an executable software program containing a plurality of basic blocks for several different operational environments or operational modes by identifying the basic blocks which execute for each particular operational environment or operational mode, and the frequency of each blocks' execution in the environment or mode. For each environment or mode, the frequency of execution for the block in that environment or mode is compared against a predetermined threshold value. Each basic block whose frequency of execution exceeds the predetermined threshold value is copied into a program segment for that environment or mode. Basic blocks whose frequency of execution does not exceed the predetermined threshold value are copied into a common code segment accessible from each of the program segments. The code in each program segment is then optimized.

The first step in optimizing the code is to identify for each entry point, the basic blocks reachable from the entry point. That is, the basic blocks reachable from a first entry point are identified, along with the basic blocks reachable from a second entry point. In general, for each entry point, the code is analyzed to determine the basic blocks reachable from the entry point.

The next step is to determine the basic blocks which are executed within the various operating environments or operating modes at a frequency which exceeds the predetermined threshold value. This process is referred to as "profiling", and involves providing a predefined set of inputs and data referred to as a "profile" to the system for each operational environment or mode. The code is executed for each set of input conditions in the profile, while the code's run-time performance is monitored by the profiler. The profiler saves the run-time information in the profile data structure.

The profiling process is repeated until a response for each of the desired input conditions which correspond to a known operating environment or mode has been recorded. Each operational environment or mode for which the code will be optimized for includes a profile data structure containing predefined inputs and run-time information gathered while monitoring the response to the inputs.

Run-time characteristics, such as, the number of times each basic block was executed in a particular environment or mode are determined from the run-time information contained in the data structure.

Once the run-time information and characteristics have been determined, the code is partitioned into a plurality of "program segments" which each correspond to a particular environment or mode. Each program segment contains a plurality of basic blocks which are each executed at a frequency of execution above a predetermined threshold value within the operational environment or mode. The remaining basic blocks are placed into a block of general purpose code which is accessible from each of the program segments.

Once the code has been partitioned into program segments and a block of general purpose code, the code in each of the program segments can be optimized for its associated operational environment or mode. Each optimized program segment is then stored by a linker as a named operational unit of the executable file. As a result of the partitioning and optimizing, the executable file is organized as a collection of distinct program segments each tuned for a different operational environment or mode, and a block of common code accessible from each of the program segments.

The present invention tunes an application program at the expense of memory. However, with the relatively low cost of memory devices, optimization is an attractive system design solution to increase system performance without increasing hardware speeds. In addition, optimization increases the maintainability and reliability of executable code, since optimization provides software programs which are well partitioned and functionally organized.

An advantage of the present invention is that by providing optimized code for different operational modes within an operational environment or mode, the locality of reference for each is reduced which reduces the execution time of the code associated with that environment or mode.

BRIEF DESCRIPTION OF THE DRAWINGS

The above and further advantages of the invention may be better understood by referring to the following description in conjunction with the accompanying drawings in which:

FIG. 4E illustrates the placement of FIGS. 4A-4D to form the illustrative flowchart;

DETAILED DESCRIPTION

Figure 1:
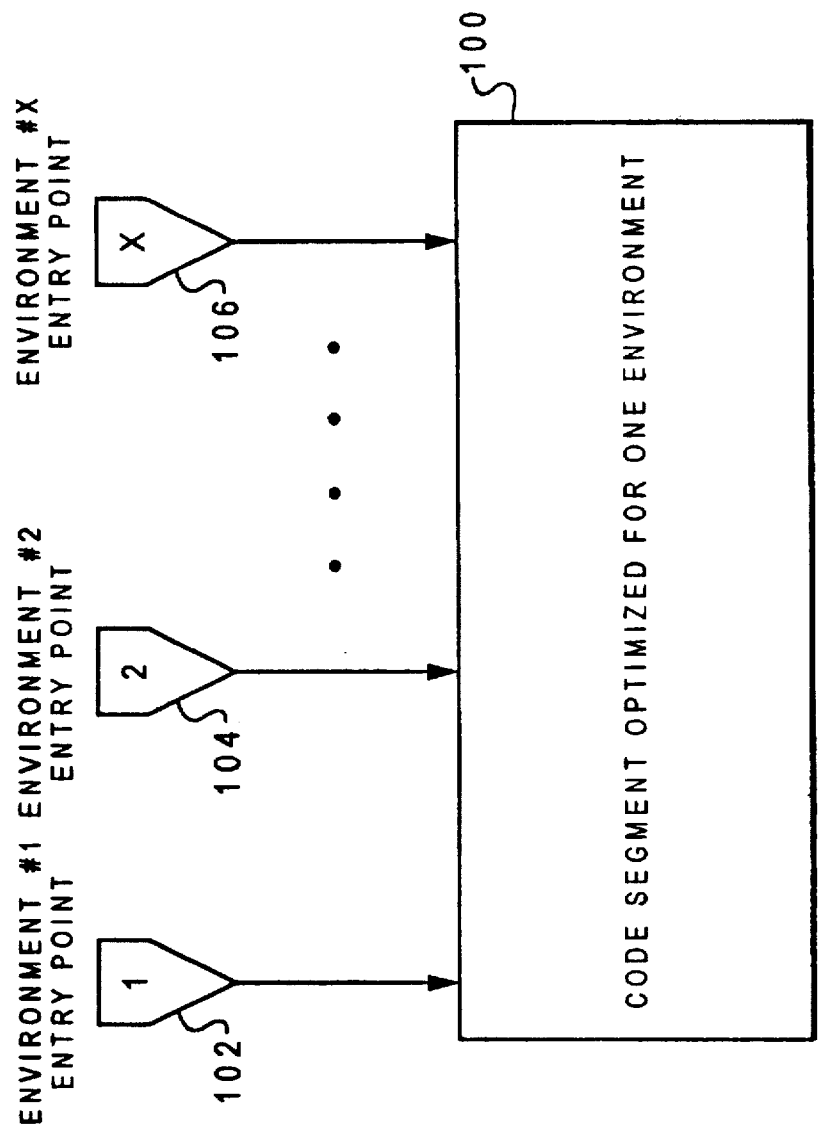
FIG. 1 illustrates a functional block diagram of a prior art code segment optimize for a single operating environment.
Figure 2:
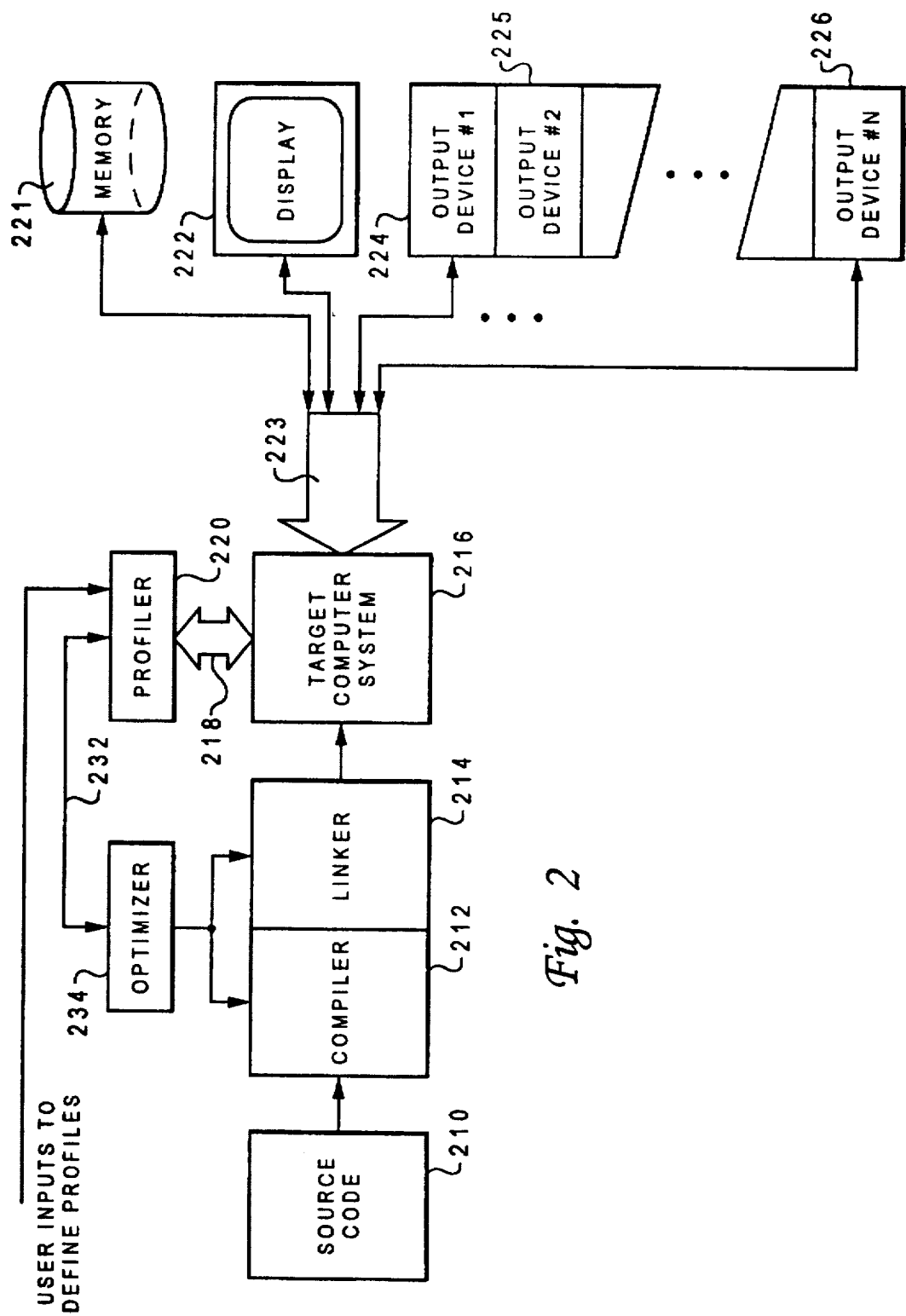
FIG. 2 illustrates a block diagram of a system for optimizing a code segment for a plurality of operational environments or modes.

FIG. 2 illustrates a block diagram of a system for optimizing a code segment for a plurality of operational environments or modes. Source code for an application program 210 is input into a optimizing compiler 212 and, in a well-known manner, the code is compiled into object modules which are then input to a linker 214. The linker 214 provides linked object code to a target computer system (e.g., an IBM personal computer) containing a CPU and memory which executes the code as a function of a plurality of user inputs and data received, via bus 218, from a profiler 220. The target computer system 216 provides control signals and data, via bus 223, to a plurality of external devices such as memory 221, a display 222 and a plurality of output devices 224-226.

The profiler 220 includes a plurality of profile data structures P1,P2, . . . PN which each contain a plurality of input conditions used to exercise the application program in a particular operational environment or mode. As an example, the profile data structure P1 may include a number of input conditions which each exercise the application program in a slightly different manner in a first operational mode. Similarly, the profile data structure P2 may include a number of input conditions which each exercise the application program in a slightly different manner in a second operational mode. Each profile data structure P1,P2, . . . PN also includes run-time information gathered by the profiler 220 while the target computer system executes the application program with inputs from the profiler.

Figure 3:
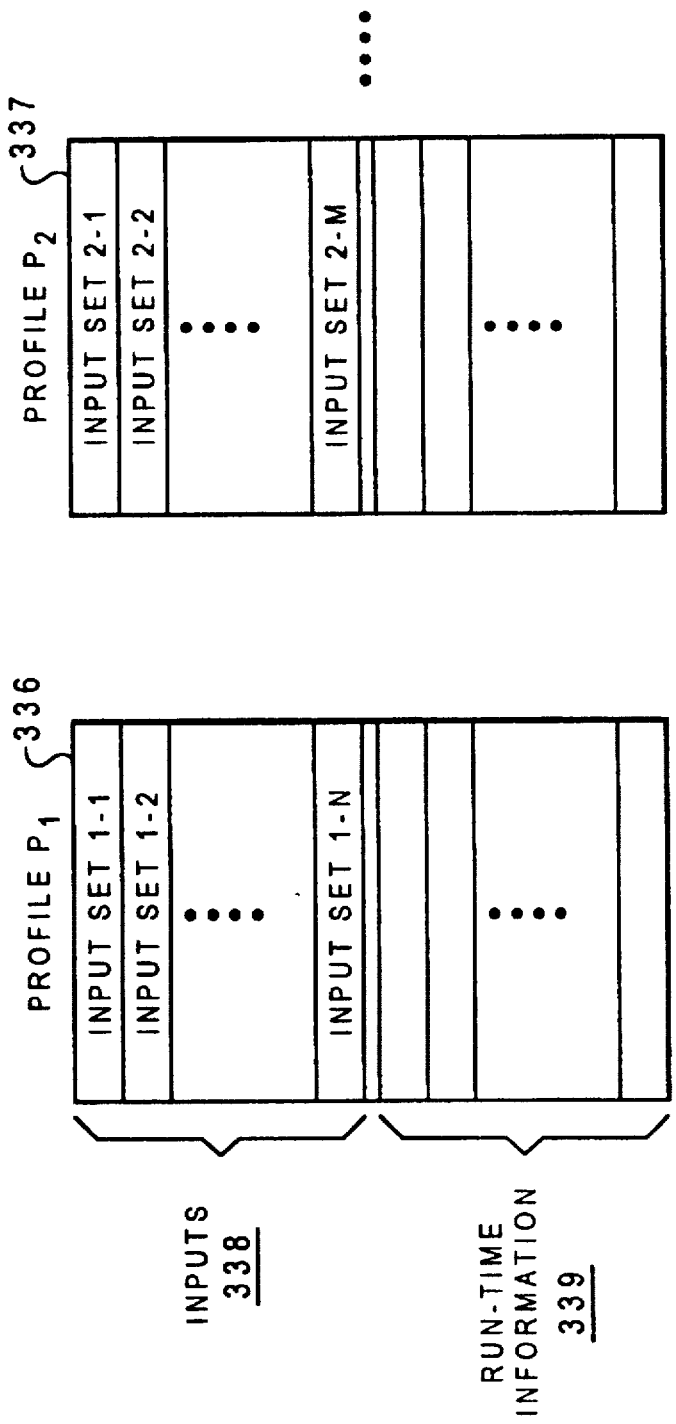
FIG. 3 illustrates a plurality of profile data structures.

As an example, FIG. 3 illustrates a plurality of profile data structures 336,337 (e.g., P1 and P2) containing a plurality of input conditions 338 and run-time information 339 including the system outputs and values of internal system variables. Referring to FIGS. 2 and 3, the profiler 220 provides the input conditions 338 via the bus 218 to the target computer system 216 and monitors the execution of the application program in the target computer system to determine application's run-time characteristics in response to the profile inputs.

Once the application program has been executed for all the input conditions of the profile data structures P1,P2, . . . PN, the run-time information is processed by the profiler 220 to determine the run-time characteristics of the application program in response to a particular set of profile inputs. The run-time characteristics are then provided on a bus 232 to an optimizer 234 which operates in cooperation with the optimizing compiler 212 and linker 214 to generate a tuned application program containing a plurality of program segments each tuned for a particular operational environment or mode.

The apparatus and method of the present invention are best understood by presenting an example of the processing of the present invention.

Figure 4A:
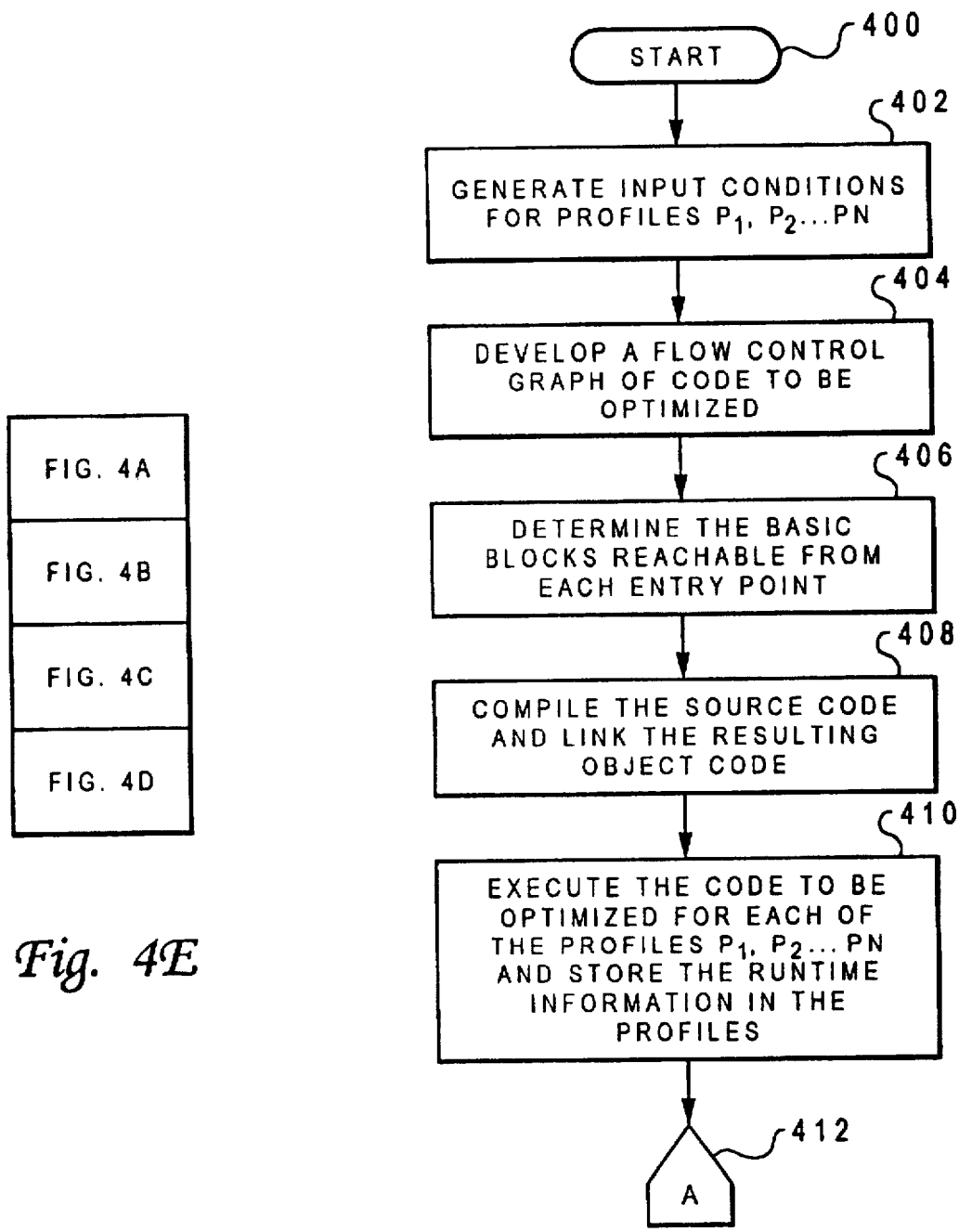
FIGS. 4A-4D together form a flow chart diagram of a routine for partitioning and tuning basic blocks of the application for a plurality of operational environs or modes.

FIGS. 4A–4D, when placed together as shown in FIG. 4E, form a flowchart representation of a processing routine for partitioning the code for its various operational environments or modes, and optimizing each of the program segments for its corresponding environment or mode. The routine begins in step 400 and proceeds to first step 402 where the processing routine generates the input conditions for the various profiles P1,P2, . . . PN. The next step 404 is to identify the executional sequence or flow control of the code to be optimized, for example with a flow control graph or other modeling mechanism.

Figure 5:
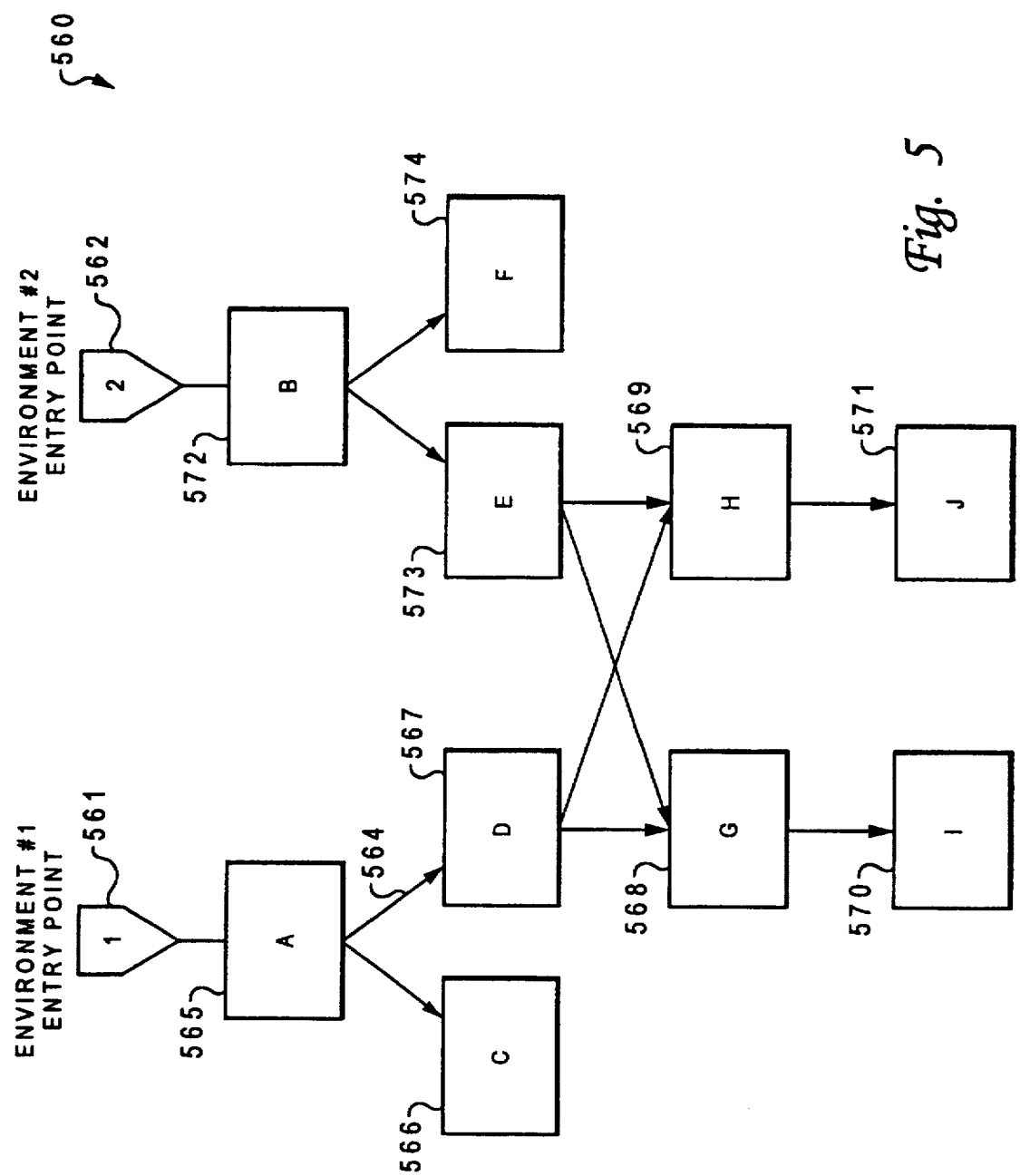
FIG. 5 illustrates a control flow block diagram of a portion of the code segment having plurality of executable basic blocks.

FIG. 5 is an illustration of a control flow graph 500 of a portion of an application program having two entry points 561,562 and a plurality of basic blocks 565–574. The basic blocks are interconnected by flow control paths (e.g., 564) that represent the executable paths the application program can take between basic blocks. The term "basic block" means any set of instructions in a computer program, whether object or source code, which is a straight line sequence of code into which branches reach only its first instruction, and from which control leaves the basic block only after the last instruction in the block. The last instruction in a basic block is generally an unconditional jump, a two-way conditional branch instruction or a multi-way branch instruction. In general, except for the last instruction in each basic block, all the other executable instructions in the block are arithmetic instructions or other instructions which do not change the flow of control to another basic block.

Referring again to FIG. 4A, the next step is a step 406 to identify the basic blocks reachable from each of the entry points 561,562 (FIG. 5). The basic blocks reachable from entry point #1 (561) include segments A,C,D,G,H,I and J designated 565–571, respectively, to form a set of basic blocks designated $R_1$. Similarly, the basic blocks reachable from a code entry point #2 (562) include B,E,F,G,H,I,J designated 572–574 and 568–571, respectively, which form a set of basic blocks designated $R_2$.

The basic blocks which are reachable from entry point #1 (561) but not entry point #2 (562), include blocks A,C,D (565–567) which form a set of basic blocks designated $R_1 \backslash R_2$. While the basic blocks reachable from entry point #2 (562) and not entry point #1 include the segments B,E,F (572–574) which form a set designated $R_2 \backslash R_1$.

The basic blocks reachable from both entry point #1 (561) and entry point #2 (562) include G,H,I,J (568–571) which form the set $R_1 \cap R_2$. Table 1 summarizes the various sets of basic blocks formed by the grouping of basic blocks described above:

TABLE 1

$R_1 = \{A,C,D,G,H,I,J\}$
$R_2 = \{B,E,F,G,H,I,J\}$
$R_1 \backslash R_2 = \{A,C,D\}$
$R_2 \backslash R_1 = \{B,E,F\}$
$R_1 \cap R_2 = \{G,H,I,J\}$ The next step in the routine is a step 408 to compile and link the source code followed by a step 410 which executes the code to be optimized for each profile P1,P2, . . . PN. During execution of the code in step 410, the profiler 220 (FIG. 2) monitors the code's execution and stores the run-time information in the profile data structure.

The inputs of the first profile P1 are selected to cause the application program execution to pass through entry point #1 (561, FIG. 5) and execute in a manner consistent with the environment or mode the profile P1 is associated with. In general, the profile P1 includes a plurality of input conditions each chosen to exercise the application code in a slightly different manner within the first environment or mode. The profiler will then monitor the execution of the application in response to each of the input conditions in the first profile P1. Similarly, profile P2 includes a plurality of input conditions each chosen to exercise the application code in a slightly different manner within the second environment or mode.

The profiler 220 typically collects the following information while monitoring the performance of the application code: 1) the number of times the application has been profiled for the particular environment, 2) the number of times each basic block 565–574 has been executed, 3) the number of times each of the two flow control paths from a two-way conditional branch instruction has been traversed, and 4) for each multi-way branch instruction, the number of times each case has been taken. From this information, the most likely path of execution can be identified along with the frequency of execution of other paths reachable from the entry point. This information is then passed to the optimizer and through to the compiler.

In general, the systems designer will know the system's operating environments and modes, and, therefore, the inputs and data conditions for the profiles to exercise the application in a particular mode. However, in a large complicated systems where fine granularity is required for the environments and modes, it is contemplated each profile may be determined by the profiler 220 in an automated manner if certain relationships between input conditions are defined to the profiler.

Profiling is discussed in the following papers each of which are hereby incorporated by reference: "Profile Guided Code Positioning", K. Bettis and R. B. Hansen, SIGPLAN Notices, (ACM Special Interest Group on Programming Languages), v.25, n.6, June 1990, pages 16–27; "The Operational Profile in Software Reliability Engineering: An Overview", J. D. Musa, Proceedings of the International Symposium on Software Reliability Engineering; and "Using Profile Information to Assist Classic Code Optimizations", P. P. Chang, S. A. Mahike, and W. W. Hwu, Software—Practice and Experience, Vol. 21(12), pages 1301–1321, John Wiley & Sons, Ltd., December 1991.

Figure 4B:
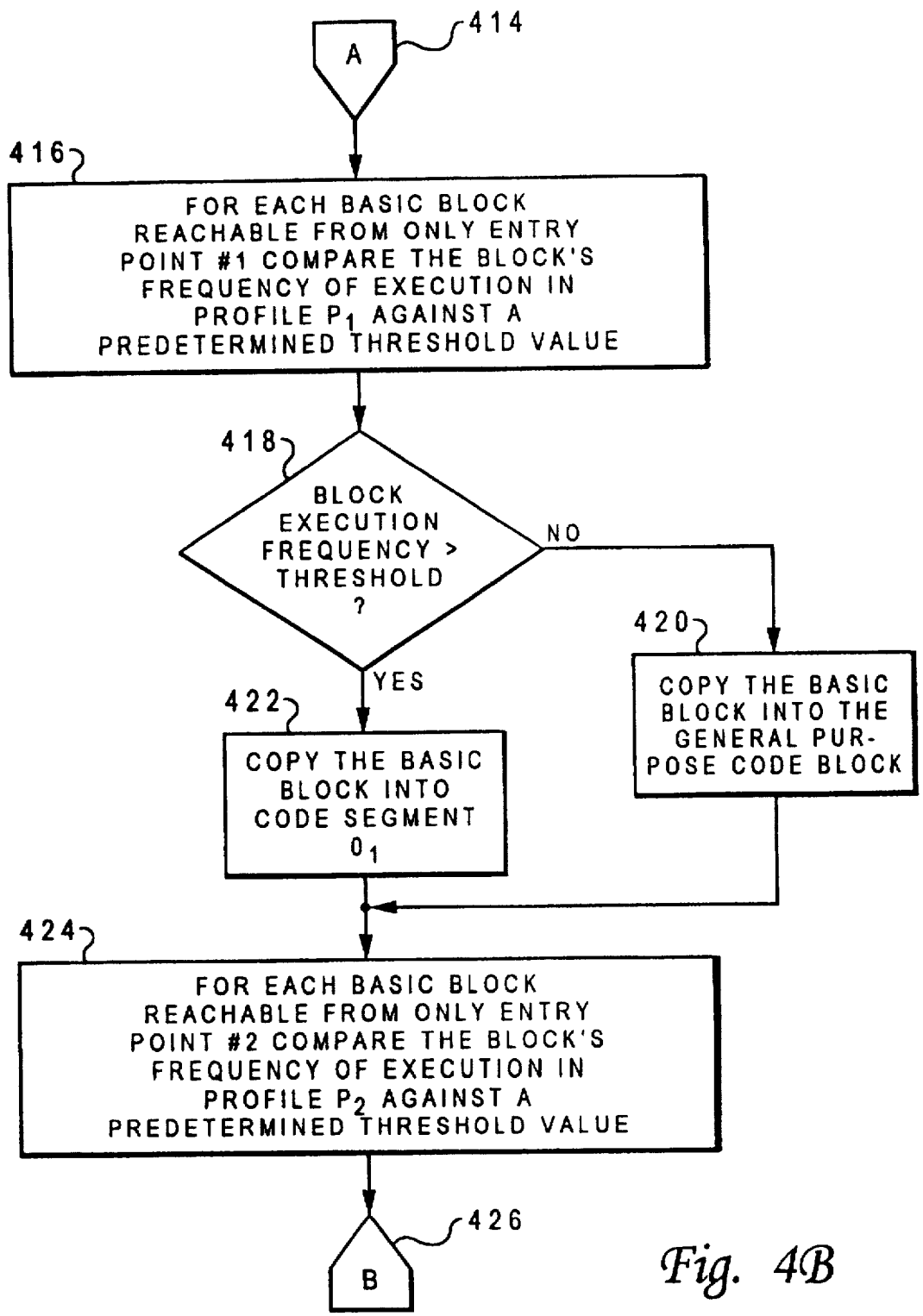

Referring now to FIGS. 4A and 4B, the routine proceeds, via off-page connectors 412 and 414, to the next step 416 which compares, for each basic block (i.e., A,C and D) reachable from only entry point #1 (561, FIG. 5), the block's frequency of execution for profile P1 against a predetermined threshold value.

A test step 418 determines if the block's frequency of execution is above the predetermined threshold value. If it is, the next step is a step 422 to copy the basic block into a first code segment O1 associated with the first operational environment or mode. Otherwise, a step 420 is performed and the basic block is placed in a block of general purpose code reachable from each of the program segments. The test step 418 is performed for each basic block reachable only from entry point #1 (561, i.e., blocks A,C,D).

As an example of this process, referring to FIG. 5, if the inputs for the first profile P1 result in only blocks A,D (566,567), respectively having a frequency of execution above the predetermined threshold value, then blocks A,D are copied into code segment O1. Block C would be copied into general purpose code in step 420 since its frequency of execution is below the predetermined threshold value.

The next step in the routine shown in FIGS. 4A–4D is a step 424 which compares, for each basic block reachable from only entry point #2 (562, FIG. 5) defined in Table 1 as the set of basic blocks {B,E,F}, the block's frequency of execution for profile P2 against a predetermined threshold value.

The routine then proceeds, via off-page connectors 426 and 428, to a test step 430 where a determination is made whether each block's frequency of execution is above the predetermined threshold value. If it is, the next step is a step 432 to copy the basic block into a second code segment O2 associated with the second operational environment or mode. Otherwise, a step 434 is performed and the basic block is placed in a block of general purpose code reachable from each of the program segments. The test step 430 is performed for each basic block reachable only from entry point #2.

Figure 4C:
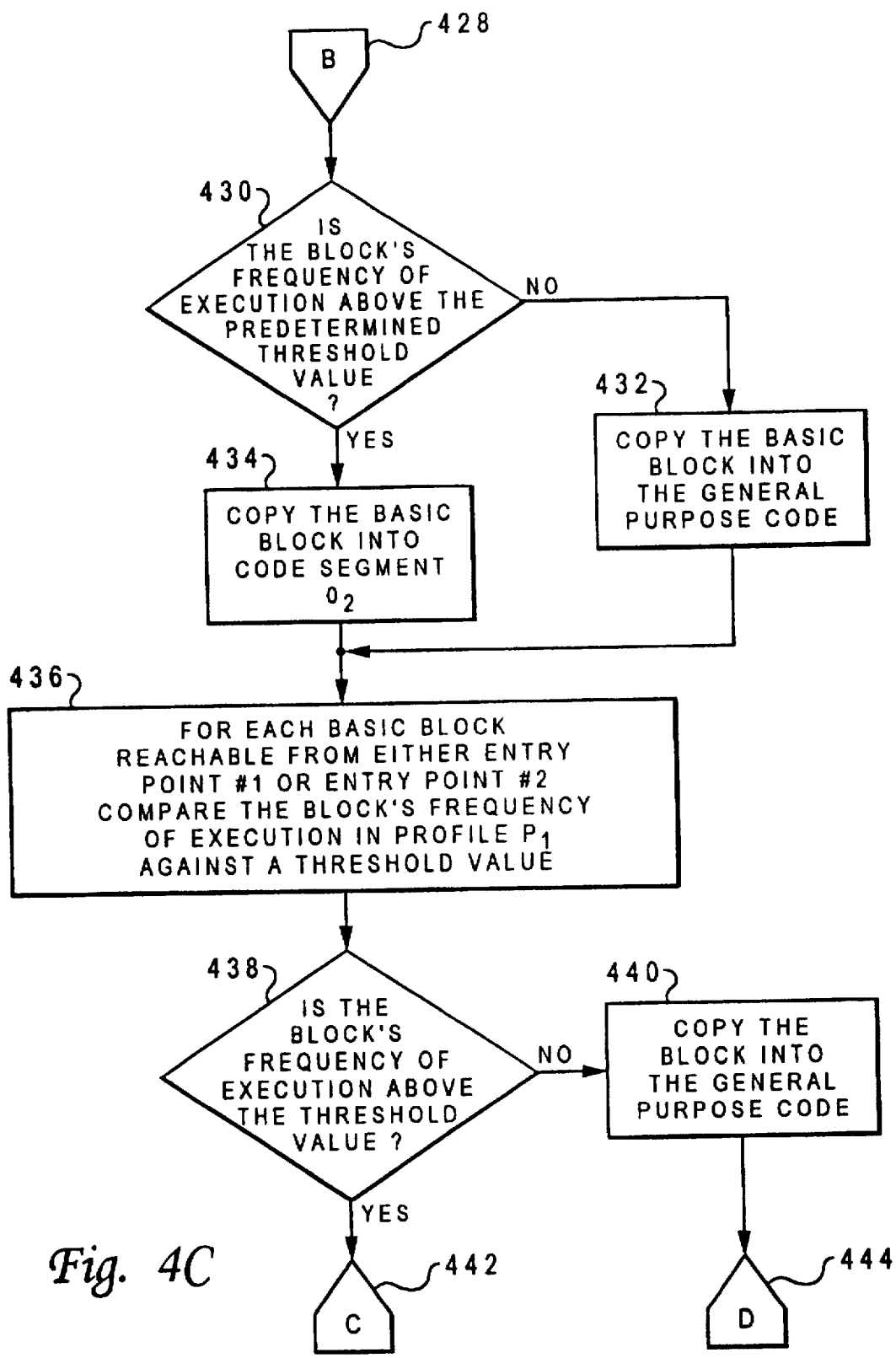

As an example of this process, referring to FIGS. 4C and 5, if the inputs for the first profile P2 result in only blocks B,E (572,573) respectively having a frequency of execution above the predetermined threshold value, then blocks B,E are copied into code segment O2 as shown in step 434. Block F would be copied into general purpose code in step 432 since its frequency of execution is below the predetermined threshold value.

The next step in the routine shown in FIGS. 4A–4D is a step 436 which compares the frequency of execution in profile P1 for each block reachable from both entry point #1 (561) and entry point #2 (562). These blocks are defined in table 1 as the set {G,H,I,J}.

A further test 438 determines if any of the blocks in the set {G,H,I,J} has a frequency of execution in the first profile P1 above the predetermined threshold value. For the blocks that do, the routine proceeds, via off-page connectors 442 and 446, to step 450 to copy the basic block into the first code segment O1 associated with the first operational environment or mode.

Otherwise, the routine proceeds to step 440 and the basic block(s) having a frequency of execution below the threshold value is placed in the general purpose code. The test 438 is performed for each basic block reachable from both entry point #1 and entry point #2 and the routine proceeds, via off-page connectors 444 and 448 to step 452. For purposes of illustration, assume blocks H and J (FIG. 5) have a frequency of execution above the first threshold value for profile P1 and therefore are placed in O1. Therefore, code segments G and I are placed into the general purpose code segment.

Similar to steps 416–420, steps 452–458 compare the frequency of execution of the blocks reachable from both entry point #1 and entry point #2 (e.g., block G,H,I and J) for the second profile P2. The basic blocks from the set {G,H,I,J} which have a frequency of execution for profile P2 above a threshold value will be copied into the code segment O2 for the second environment or mode. The blocks having a frequency of execution below the threshold will be placed into the general purpose code. If a copy of the block is already in the general purpose code segment, it is not copied. Assume, again for purposes of illustration, that the basic blocks having a frequency of execution for the second profile P2 above the threshold level also include blocks H and J (FIG. 5) and therefore these blocks are copied into the code segment O2 associated with the second environment or mode.

Figure 6:
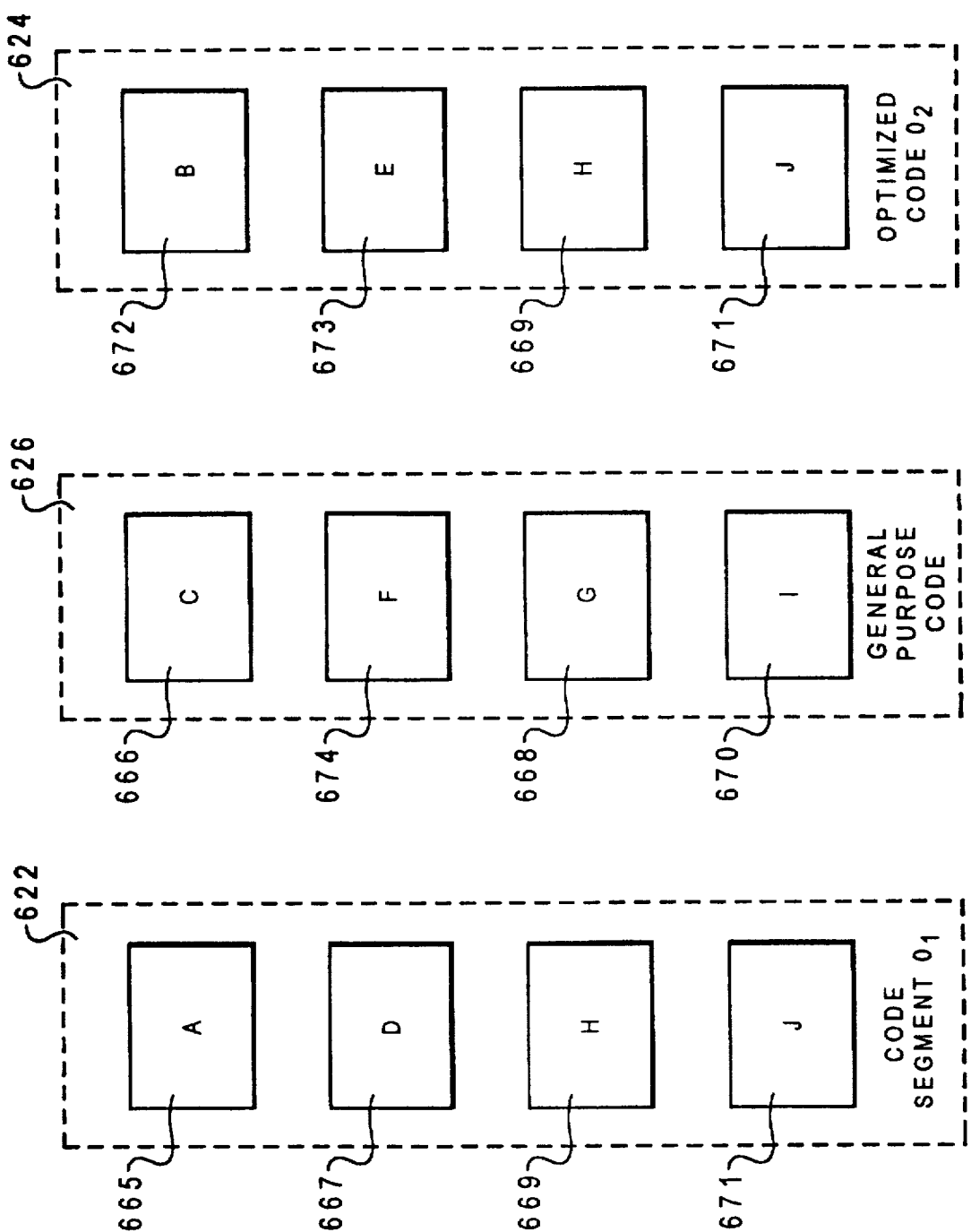
FIG. 6 is an illustration of the code segments containing the basic blocks illustrated in FIG. 5 and partitioned according to the present invention.

FIG. 6 is an illustration of the basic blocks partitioned according to the present invention. The first code segment O1 622 associated with the first operational environment or mode includes basic blocks A,D,H and J. The second code segment O2 associated with the second environment or mode includes basic blocks B,E,H and J. The general purpose code 626 includes blocks C,F,G and I. Attention is drawn to the fact that the partitioned basic blocks (i.e., 665–674) shown partitioned in FIG. 6 are the same basic blocks shown in the non-partitioned FIG. 5 (i.e., 565–574).

Figure 4D:
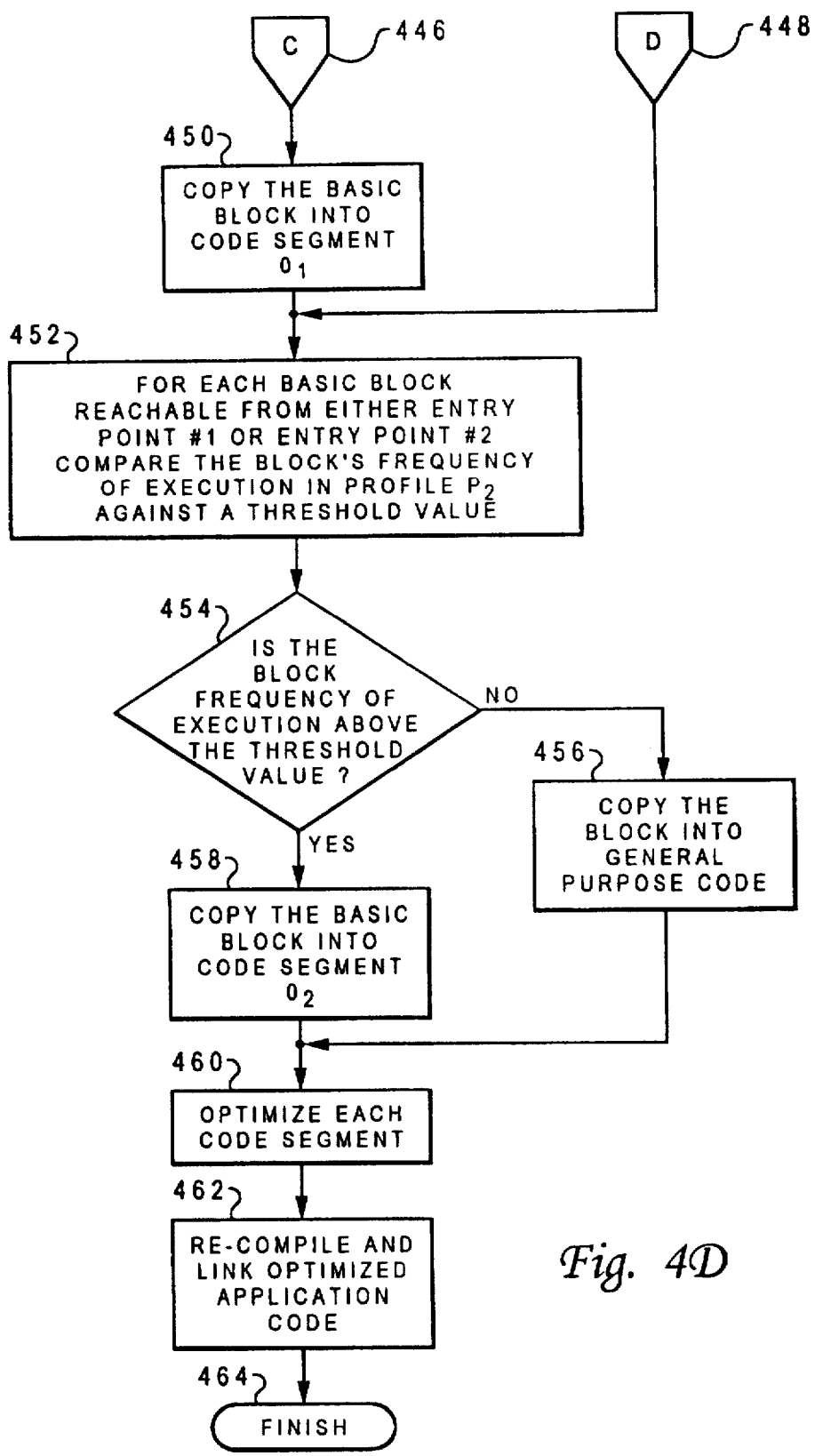

Referring to FIG. 4D, now that the application code has been partitioned into code segments (i.e., O1 and O2) associated with each environment or mode, and a block of general purpose code, the next step is a step 460 to optimize the partitioned code segments O1,O2 for their particular environment or mode of operation using the run-time information in the profiles P1 and P2. That is, O1 is optimized using the run-time information in profile P1 to guide the optimization, while the optimization of O2 is guided by the run-time information in profile P2. In a well-known manner, there are several known optimization technique which can be applied to the reorganized application code in segments O1 and O2. These optimization techniques include for example, constant propagation, copy propagation, constant combining, common sub-expression elimination, redundant load elimination, and redundant store elimination.

The next step in the routine is a step 462 to recompile and re-link the optimized code and the routine finishes in step 464.

Figure 7:
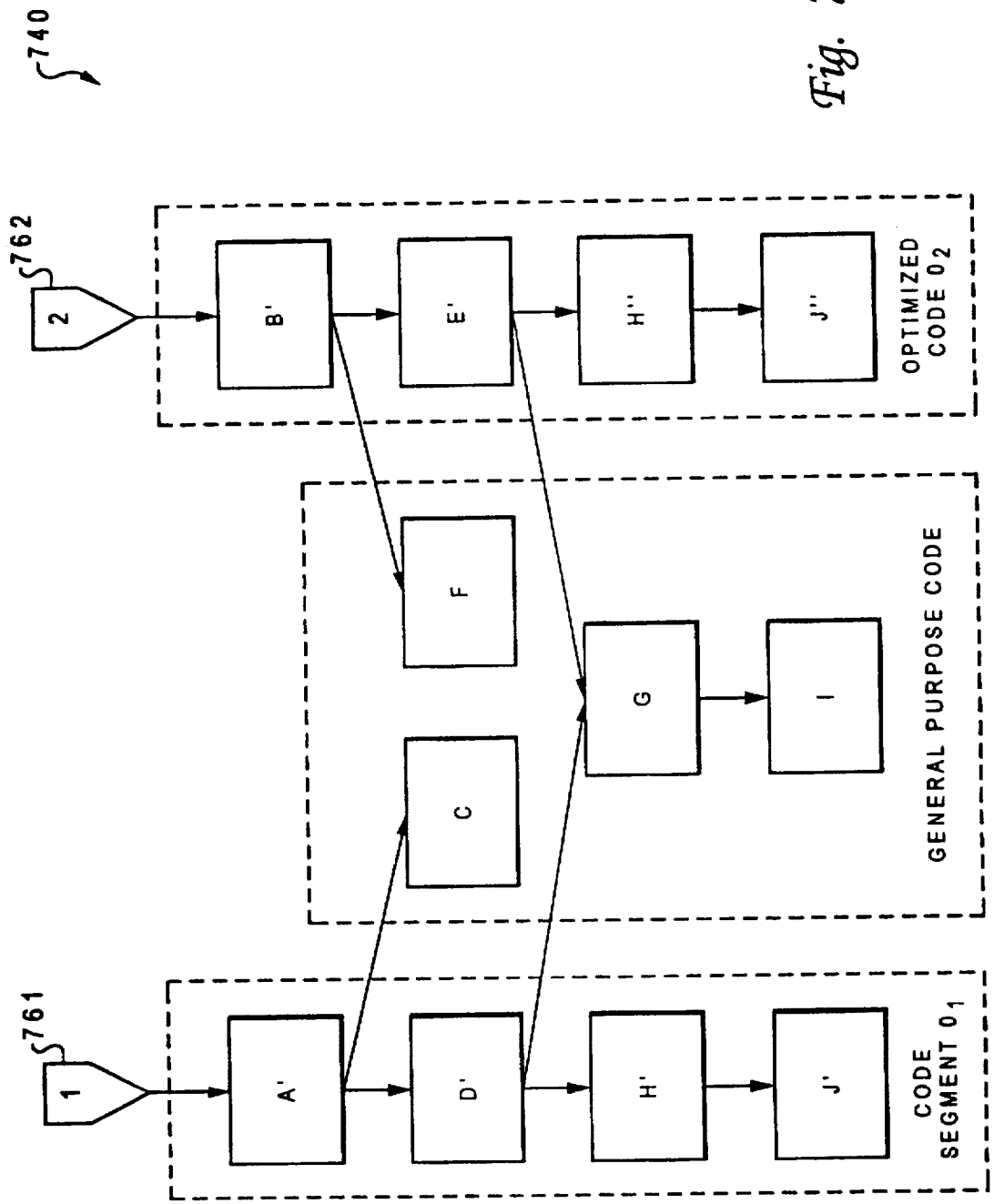
FIG. 7 is an illustration of the code segments $O_1$ and $O_2$ each optimized for its particular environment and a block of general purpose code, all linked to form an executable code segment partitioned and optimized according to the present invention.

FIG. 7 illustrates an executable code segment 740 partitioned and optimized for operation in several different operating environment or modes according to the present invention. The executable code segment 740 includes entry point #1 (561) and entry point #2 (562) which enter optimized code segments O1 and O2 respectively. Note, the basic blocks illustrated in optimized code segment O1 and optimized code segment O2 are primed (e.g., H') to indicate those basic blocks have been optimized. In addition, note the optimized basic blocks in O1 and O2 indicative of H and J are designated as single and double primed (e.g., H' and H") respectively since the optimizer 234 (FIG. 2) may tune each program segment differently based upon the profile (i.e., P1 or P2) used to guide the optimization.

The amount of partitioning of the original application program that occurs can be controlled by selection of the predetermined threshold value. As an example, the higher the threshold value, the smaller the code segments O1 and O2 become since the frequency of execution required for placement of each code block in the segment is higher.

Although the present invention has been shown and described with respect to a preferred embodiment thereof, it should be understood by those skilled in the art that various other changes, omissions, and additions to the form and detail thereof, may be made therein without departing from the spirit and scope of the invention. For example, one of ordinary skill will appreciate that the optimization process of the present invention is clearly not limited only to programs which have two entry points. The disclosed example of two entry points is merely used for brevity and to facilitate teaching of the present invention.

For instance, if three entry points are used, the disclosed routine would be modified to identify the basic blocks executable from each of the three entry points and execute an application for the different profiles while monitoring the application's run-time performance. A comparison would then be performed for each environment and its associated profile to determine the basic blocks which execute for that environment at a frequency above a certain threshold. Those blocks would then be copied into a code segment for that particular environment. The basic blocks which execute at a frequency below the certain threshold are copied into a block of general purpose code. The code segments for each environment would then be optimized for its particular environment, and the code recompiled and linked to provide an executable piece of code optimized for several different operating environments or modes.

In an alternate embodiment, the invention may be implemented as a computer program product for use with a computer system. Such implementation may comprise a series of computer usable instructions either fixed on a tangible medium, such as a computer readable media, e.g. diskette, CD-ROM, ROM, or fixed disk, or transmittable to a computer system, via a modem or other interface device, over either a tangible medium, e.g., optical or analog communications lines, or intangibly using wireless techniques, e.g., microwave, infrared or other transmission techniques. The series of computer usable instructions embodies all or part of the functionality previously described herein with respect to the invention. Those skilled in the art will appreciate that such computer usable instructions can be written in a number of programming languages for use with many computer architectures or operating systems. Further, such instructions may be stored using any memory technology, for example, semiconductor, magnetic, optical or other memory devises, or transmitted using any communications technology, for example, infrared, microwave, or other transmission technologies. It is contemplated that such a computer program product may be distributed as a removable media with accompanying printed or electronic documentation, e.g., shrink wrapped software; preloaded with a computer system, e.g., on system ROM or fixed disk, or distributed over a communications network, e.g., the Internet or World Wide Web.

What is claimed is:

1. A method of optimizing executable code for operation in a plurality of different operating environments or modes, the method comprising the steps of:
    A. executing the code with predetermined input conditions from one of the plurality of operating environments or modes;
    B. monitoring the execution of the code to identify non-branching code blocks which execute more than a predetermined number of times and to identify non-branching code blocks which execute less than a predetermined number of times;
    C. combining the non-branching code blocks which execute more than a predetermined number of times to form a program segment and combining the identified non-branching code blocks which execute less than a predetermined number of times to form a general purpose program segment which is common to all program segments;
    D. repeating steps A through C for each operating environment and mode; and
    E. optimizing each of the program segments.

2. The method of claim 1 wherein step B comprises the steps of:
    B1. identifying non-branching code blocks within the code; and
    B2. identifying the executional sequence of the code to identify the code blocks which execute in the one operating environment or mode.

3. The method of claim 1 wherein step A comprises the step of:
    A1. storing runtime information generated by the code during execution; and wherein step E comprises the step of:
    E1. using the stored runtime information to optimize each of the code segments.

4. The method of claim 1 wherein step A comprises the step of:
    A2. storing a plurality of input conditions for each of the plurality of operating environments and modes in a profile file.

5. Apparatus operable in a computer system for optimizing executable code for operation in a plurality of different operating environments or modes, the apparatus comprising:
    means responsive to predetermined input conditions from one of the plurality of operating environments or modes for executing the code;
    apparatus in the computer system for monitoring the execution of the code to identify first non-branching code blocks which execute more than a predetermined number of times and for identifying second non-branching code blocks which execute less than a predetermined number of times and for storing identification information;
    means responsive to the first code block identification information for combining the identified first code blocks to form a program segment and responsive to the second code block identification information for combining the second code blocks to form a general purpose program segment which is common to all program segments;
    means controlled by the computer system for changing the operating environment or mode and for controlling the executing means to reexecute the code to generate a program segment for each operating environment and mode; and
    means operable after a program segment has been generated for each operating environment and mode for optimizing each of the program segments.

6. The apparatus of claim 5 wherein the monitoring apparatus comprises:
    means responsive to the code for identifying non-branching code blocks within the code; and
    means responsive to the identification of branching and non-branching code blocks for identifying the execution sequence of the code blocks which execute in the one operating environment or mode.

7. The apparatus of claim 5 wherein the execution means comprises:
    means responsive to the execution of the code for storing runtime information generated by the code during execution; and wherein the optimization means comprises:
    means responsive to stored runtime information for optimizing each of the code segments.

8. The apparatus of claim 5 wherein the execution means comprises:
    means for storing a plurality of input conditions for each of the plurality of operating environments and modes in a profile file.

9. A method of optimizing executable code for a plurality of different operating environments or modes, the code comprising a plurality of non-branching code blocks and having an entry point for each of the plurality of different operating environments or modes, the method comprising the steps of:

A. identifying the code blocks reachable from each of the entry points;

B. executing the executable code with the input conditions from each of the plurality of operating environments and modes;

C. monitoring the execution of the code for each of the input conditions to identify which of the code blocks identified in step A was executed and the number of times each of the identified code blocks was executed;

D. partitioning the code into a plurality of program segments, each of the plurality of program segments corresponding to one of the plurality of operating environments or modes and containing code blocks which were executed at least a predetermined number of times during execution of the code; and E. optimizing each of the plurality of program segments.

10. The method of claim 9 wherein step D comprises the step of:

D1. comparing the number of times a selected code block was executed during code execution to a predetermined threshold value; and D2. placing a copy of the selected code block into a program segment associated with a particular operating environment or mode when the number of times the selected code block was executed exceeds the predetermined threshold value.

11. The method of claim 9 wherein step E comprises the step of:

E1. eliminating common sub-expressions in each program segment.

12. The method of claim 9 wherein step E further comprises the step of:

E2. performing a redundant store elimination on each program segment.

13. The method of claim 9 wherein step E further comprises the step of:

E3. performing a redundant load elimination on each program segment.

14. The method of claim 9 wherein step B comprises the step of:

B1. generating a plurality of profile data structures, each of the plurality of profile data structures containing a plurality of input conditions for each operational environment or mode for which the code will be optimized.

15. The method of claim 9 wherein step B further comprises the step of:

B2. storing runtime information generated by the code during execution; and wherein step E further comprises the step of:

E4. using the stored runtime information to optimize each of the code segments.

16. The method of claim 9 wherein step C comprises the step of:

C1. monitoring the execution of the code to identify non-branching code blocks which execute less than a predetermined number of times; and wherein step D further comprises the step of:

D3. combining the code blocks identified in step C1 to form a general purpose program segment which is common to all program segments.

17. A computer program product comprising:

a computer usable medium having computer readable program code means embodied thereon for optimizing executable code for a plurality of different operating environments or modes, the code having a plurality of non-branching code blocks and having an entry point for each of the plurality of different operating environments or modes, the computer usable medium comprising:

program code means, responsive to said entry points, for identifying the code blocks reachable from each of the entry points;

program code means for executing the executable code with input conditions from each of the plurality of operating environments and modes;

program code means, responsive to the execution of the code, for monitoring the execution of the code for each of the input conditions and for generating runtime information which identifies which of the identified code blocks was executed and the number of times each of the identified code blocks was executed;

program code means, responsive to said runtime information, for partitioning the code into a plurality of program segments, each of the plurality of program segments corresponding to one of the plurality of operating environments or modes and containing first code blocks which were executed at least a predetermined number of times during execution of the code; and program code means, responsive to the completion of execution of the code, for optimizing each of the plurality of program segments.

18. The computer program product of claim 17 wherein the program code means for partitioning comprises:

program code means, responsive to execution of the code, for comparing the number of times a selected code block was executed during code execution to a predetermined threshold value; and program code means for placing a copy of the selected code block into a program segment associated with a particular operating environment or mode when the number of times the selected code block was executed exceeds the predetermined threshold value.

19. The computer program product of claim 17 wherein the program code means for optimizing program segments comprises:

program code means for eliminating common sub-expressions in each program segment.

20. The computer program product of claim 17 wherein the program code means for optimizing program segments comprises:

program code means for performing a redundant store elimination on each program segment.

21. The computer program product of claim 17 wherein the program code means for optimizing program segments comprises:

program code means for performing a redundant load elimination on each program segment.

22. The computer program product of claim 17 wherein the program code means for executing the executable code comprises:

program code means for generating a plurality of profile data structures, each of the plurality of profile data structures containing a plurality of input conditions for each operational environment or mode for which the code will be optimized.

23. The computer program product of claim 17 wherein the program code means for executing the executable code comprises:

program code means responsive to the execution of the code for storing runtime information generated by the code during execution; and wherein the program code means for optimizing further comprises:

program code means, responsive to a completion of the execution of the code, for using the stored runtime information to optimize each of the code segments.

24. The program code means of claim 17 wherein the program code means for monitoring comprises:

program code means for monitoring the execution of the code to identify second non-branching code blocks which execute less than a predetermined number of times; and wherein the program code means for partitioning further comprises:

program code means for combining the second code blocks to form a general purpose program segment which is common to all program segments.

25. A computer system comprising:

a central processing unit;

a memory;

an application program containing executable code stored in the memory and operable on the central processing unit in a plurality of different operating environments or modes, the code comprising a plurality of non-branching code blocks and having an entry point for each of the plurality of different operating environments or modes;

means controlled by the application program and responsive to the entry points for identifying the code blocks reachable from each of the entry points;

means for executing the executable code on the central processing unit with the input conditions from each of the plurality of operating environments and modes;

a profiler responsive to the execution of the code for monitoring the execution of the code for each of the input conditions and for generating runtime information which identifies which of the identified code blocks was executed and the number of times each of the identified code blocks was executed;

a compiler responsive to the runtime information for partitioning the code into a plurality of program segments, each of the plurality of program segments corresponding to one of the plurality of operating environments or modes and containing first code blocks which were executed at least a predetermined number of times during execution of the code; and an optimizer responsive to the completion of execution of the code for optimizing each of the plurality of program segments.

26. A computer program product, comprising:

a computer usable medium having computer readable program code means embodied in said medium for optimizing executable code for a plurality of different operating environments or modes, the executable code comprising a plurality of non-branching code blocks and having an entry point for each of the plurality of different operating environments or modes, the computer program product comprising:

first program code means for identifying the code blocks reachable from each of the entry points;

second program code means for causing a computer to execute the executable code with predetermined input conditions from each of the plurality of operating environments and modes;

third program code means for monitoring the execution of the code for each of the input conditions to determine which of the identified code blocks was executed and the number of times each of the identified code blocks was executed;

fourth program code means for causing partitioning the executable code into a plurality of program segments, each of the plurality of program segments corresponding to one of the plurality of operating environments and modes, each of the plurality of program segments containing code blocks which were executed at least a predetermined number of times during execution of the code; and fifth program code means for optimizing each of the plurality of program segments.

27. The computer program product as defined in claim 26 wherein the fourth program code means comprises:

program code means, responsive to execution of the code, for comparing the number of times a selected code block was executed during code execution to a predetermined threshold value; and program code means for causing the computer to place a copy of the selected code block into a program segment associated with a particular operating environment and mode when the number of times the selected code block was executed exceeds the predetermined threshold value.

28. The computer program product of claim 26 wherein the fifth program code means includes program code means for eliminating common sub-expressions in each program segment.

* * * * *